United States Patent Office 3,510,672
Patented May 5, 1970

3,510,672
REGULATING SYSTEM FOR UNIFORMLY
DISTRIBUTING THE LOAD UPON PARALLEL
OPERATING ALTERNATORS
Herbert Poppinger, Munich, Heinz Lutge, Erlangen, and
Manfred Liska, Munich, Germany, assignors to Siemens
Aktiengesellschaft, a corporation of Germany
Filed Nov. 19, 1968, Ser. No. 777,120
Claims priority, application Germany, Dec. 20, 1967,
1,588,808
Int. Cl. H02j 3/46
U.S. Cl. 307—53
8 Claims

ABSTRACT OF THE DISCLOSURE

An electric power generating system in which two or more alternators which are individually driven supply electric power in parallel relation to the same bus conductors, there is provided a regulating system for uniformly distributing upon the parallel alternators the load with respect to the active power supplied to the bus. Each alternator drive for this purpose is provided with a speed regulator for varying the generated power output of the individual alternator. Each alternator is further provided with a power regulator in response to the power furnished to the bus provides a datum quantity or reference value for the operation of the speed regulator. The power regulator has input means equipped with a power sensing means which responds to the alternator output and supplies a datum quantity that is indicative of the difference between a first magnitude inversely proportional to the active power issued by the alternator, and a second magnitude proportional to the alternator frequency. Each alternator regulating system further comprises a regulating amplifier whose gain is variable, the gain control means being connected to and responsive to a voltage drop across a decoupling resistor which is connected to the appertaining alternator so that the amplifying gain varies as to magnitude and polarity with the voltage drop of the decoupling resistor in the sense required to secure the desired uniform distribution of the load upon the alternators operating in parallel.

Our invention relates to electric power generating and distributing systems in which individually driven alternating-current generators (alternators) feed the generated power in parallel relation to each other through common bus conductors. More specifically, the invention concerns a regulated system which takes care of securing a substantially uniform load distribution of the active power issuing from such parallel connected alternators to the bus. Regulated systems of this type operate with an inevitable and sometimes appreciable margin of error with respect to the degree of uniformity attained relative to the load distribution of active power upon the respective alternators; and it is an object of our invention to minimize the occurrence and possible magnitude of such regulating errors.

The invention will be further described with reference to the accompanying drawings of which FIGS. 2 and 3 represent embodiments of the invention by way of example.

In regulated power systems of the type here concerned, each of the alternators operating on the main bus has its own driving engine such as a diesel engine. The power generated by the alternator is variable by means of a speed regulator of the proportional type (P-type regulator) which determines the speed of the alternator drive. The datum value for this speed regulator is supplied from the power regulator of an integral characteristic. Supplied to the input side of the power regulator is the difference between the first magnitude which is inversely proportional to the issued active power of the appertaining alternator, and the second magnitude which is proportional to the frequency of the current generated by the same alternator. The input circuitry for providing the difference value for the power regulator comprises a measuring or sensing member electrically connected to the individual alternator for furnishing a voltage or other magnitude indicative of the generated electric power, and there is also provided a function modifying converter, such as an inverter between the sensing member and the power regulator for the purpose of furnishing the first-mentioned magnitude that is inversely proportional to the power output of the individual alternator.

Figure 1:
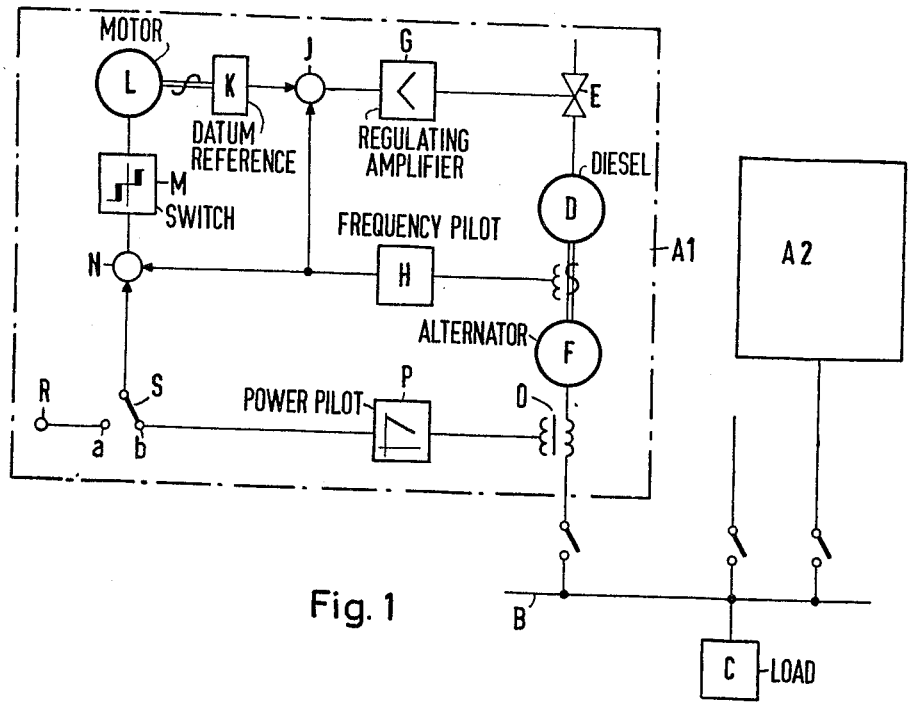
FIG. 1 is a block diagram of a system of parallel connected alternators individually regulated for uniform load distribution of the generated active power.

A regulating system of the type just broadly described is schematically shown in FIG. 1. Represented in this illustration are two alternator sub-systems A1 and A2 which are connected by respective power switches AB to a common main bus B shown to energize a load C. As mentioned, more than two alternator sub-systems may thus be connected in parallel relation to the same bus B. Only the sub-system A1 is shown in detail and will be more fully described hereinafter, because each of the other alternator sub-systems may be designed and operated in an identical manner.

Each sub-system comprises an alternator F whose shaft is coupled with and driven by a prime mover D, for example a diesel engine, whose combustible feed supply is adjustable by means of a control valve E. The positioning of this control valve is determined by the output magnitude of a regulating amplifier G. The input of the amplifier G receives a signal from a comparator J which signal is in accordance with the difference between the datum value and the pilot value, the pilot value being formed with the aid of a transducer H which responds to the rotating speed of the alternator and thus furnishes a pilot value proportional to the generated frequency.

The above-mentioned datum value (also called reference value or pattern value) is not constant. It is rather furnished from a datum transmitter K which is mechanically coupled with an auxiliary drive motor L electrically controlled by means of the three-point switch MS in one or the other direction or to remain at rest, depending upon whether the switch MS is in the positive (plus), negative (minus) or off (zero signal) state. The three-point switch MS is controlled by receiving as input the difference, formed by a comparator NC, between the above-mentioned value proportional to the rotating speed and, with the illustrated switch S in the position shown, a value inversely proportional to the power issued from the alternator F. The latter value is produced with the aid of a measuring or sensing member O which furnishes a voltage proportional to the power output, and by another component PC which converts the characteristic of the voltage in the sense of an inverter.

Figure 2:
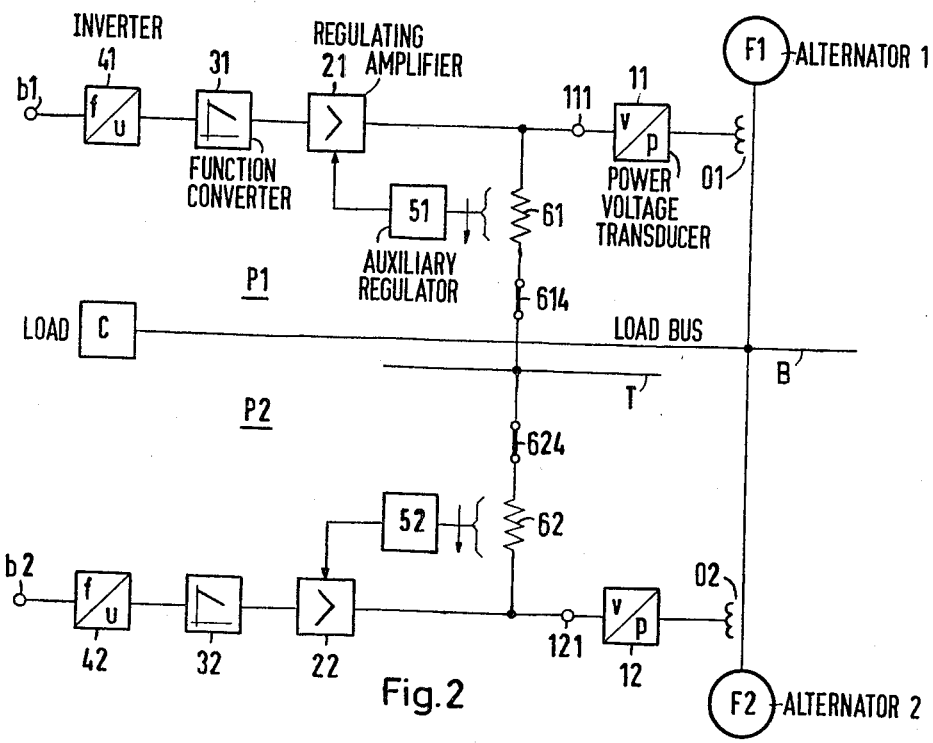
FIG. 2 is a schematic circuit diagram, partly in block fashion, of the components to be incorporated in a system of the type generally shown in FIG. 1 for the purpose of realizing the present invention.

With respect to the terminology used in this specification and relative to the type of block diagrams shown in FIGS. 1 and 2, as well as to the design and performance of the above-mentioned components, reference may be had to the copending application of W. Speth, Ser. No.

737,995, filed June 18, 1968, and to the literature mentioned in that specification, and including the book "Feedback Control Systems," by Gille, Pelegrin & Decaulne, McGraw Hill Book Co., New York (1959), the book "Analysis of Feedback Control Systems," by Bruns & Saunders, McGraw Hill Book Co., New York (1955), as well as to the German Standards for Regulation Systems, published as "DIN-19226," January 1954, under the title "Regelungstechnik" by Deutscher Normenausschuss.

The magnitudes compared with each other at comparator NC are preferably frequencies. This affords a particularly simple possibility of synchronizing an alternator sub-system, for example the sub-system A1 to the frequency of the voltage obtaining at the bus B, prior to switching the sub-system A1 at switch AB onto the bus. It is then only necessary to place the switch S to the position $a$ and to supply through the terminal R a voltage having the frequency of the bus voltage. The datum value for the speed regulator (constituted by the components H, J, G, E) is then varied by the power regulator (constituted by the combination of components NC, MS, L, K) until the frequency of the alternator F coincides with the bus frequency. Only then will the three-point switch MS operate to switch the auxiliary motor L to standstill.

Together with the connection of the sub-system A1 to the bus B, the switch S is simultaneously placed into the position $b$. As a result, the power regulator (NC, MS, L, K) now receives a datum value which is inversely proportional to the power issued from the alternator F. The component PC is so designed that during idle run of the alternator F, the preset datum frequency is slightly higher than the frequency of the bus voltage. Consequently, as soon as the sub-system A1 is switched onto the bus B, the power regulator will again respond to increase the datum value for the speed regulator (H, J, G, E) which then opens the control value E thereby increasing the feed supplied to the diesel engine D. This, however, does not result in increasing the speed of rotation if, as is usually the case in such power systems, the alternators driven by the diesel engines are synchronous generators. In such cases, only the rotor displacement angle and hence the share of the load carried by the alternator is varied.

With two sub-systems operating in the foregoing manner upon a common bus, the total load would be distributed onto the two sub-systems in exactly equal shares in the relation between the datum value furnished at the output of component PC and the active power issued from the respective sub-systems were exactly the same in each of these two subsystems. This is because, on account of the integral-action power regulator, the original droop of the proportional speed regulator circuits in the individual sub-systems is no longer of any concern. The desired, resultant static of the individual sub-systems rather is determined exclusively by the characteristic of the datum-value circuit of components O and PC. If these respective characteristics differ from each other, this being in most cases inevitable in practice, there will constrainedly result an uneven load distribution.

For the purpose of explanation, it may here be added that it is a property of a proportional regulator circuit that with increasing load the actual or pilot speed will increasingly depart from the datum value, the error representing the "droop" or "proportional departure." This "droop" or "proportional departure" is larger with a lower amplifying gain of the regulating circuit. It thus is another, more specific object of our invention to reduce the load-distribution error in a regulating system generally of the above-described type.

To this end, and in accordance with a feature of our invention, we provide for each of the parallel-connectable alternators a regulating amplifier whose amplifying gain is adjustable and which is interposed between the measuring or sensing member of the sub-system and its power regulator. The regulating amplifiers for all of the alternators have their respective inputs connected through decoupling resistors of the same resistance to a common bus. Furthermore, the gain control of each regulating amplifier is connected to the appertaining decoupling resistor so that the amplifying gain varies in dependence upon the magnitude and polarity of an auxiliary voltage corresponding to the voltage drop if the decoupling resistor. The dependence of amplifying gain upon the varying voltage drop is such as to provide for the desired more uniform load distribution between the alternators. This requires, for example, that the difference of the output voltages furnished by the respective regulating amplifiers is increased with an increase in voltage drop of a decoupling resistor, in systems wherein the regulating amplifier is arranged ahead of the inverter or a like function generator. Conversely, the difference of the alternator output voltage is to be decreased in cases where the regulating amplifiers are located behind the just-mentioned inverter or the like function generator.

According to another, preferred feature of our invention, a virtually equal load-sharing of the alternators is achieved by applying the voltage drop occuring at each of the above-mentioned decoupling resistors to the input of an integral-type auxiliary regulator whose output quantity controls the gain of the appertaining regulating amplifier. This auxiliary regulator, according to a further specific feature of the invention, may be composed of a three-point switching circuit followed by a motoric adjusting member (similar to the components MS and L in FIG. 1). As a rule, however, the auxiliary regulator simply and preferably consists of an amplifier equipped with a differentiating negative feedback (integrator) circuit.

According to still another way of designing a regulating system according to the invention is to vary the amplifying factor (gain) of the regulating amplifier in proportion to the voltge drop of the appertaining decoupling resistor. A particularly simple circuitry is obtained in this manner by connecting a portion of this decoupling resistor into the negative feedback cicuit of the regulating amplifier.

The embodiment of the invention illustrated in FIG. 2 serves to exemplify the above-mentioned features and should be understood to represent an improved and additional portion of a power-generating and distributing system, as otherwise shown in FIG. 1, thus requiring both illustrations to be now considered in conjunction with each other. It will be recognized, therefore, that the system of several alternator sub-systems such as those shown at A1 and A2 in FIG. 1, and essentially designed as described above with reference to FIG. 1, of which in FIG. 2 only the active-power measuring or sensing member (O in FIG. 1) is shown at O1 in FIG. 2 for one of the two alternators F1, and correspondingly at O2 for the second alternator F2. The corresponding PC components are shown in FIG. 2 at P1, P2, but only up to the terminal $b$ in FIG. 1, the corresponding terminals for the two alternators being denoted by $b1$ and $b2$ in FIG. 2. Each of terminals $b1$ and $b2$ appertain to a switch as shown at S in FIG. 1.

As is more specifically illustrated in FIG. 2, the active-power measuring sensing member O1 (O2) further comprises a power-voltage transducer device 11 (12) at whose output terminal 111 (121) there occurs a voltage proportional to the power issuing from the coordinated alternator F1 (F2). This power-indicative voltage is supplied to a regulating amplifier 21 (22) which is followed in the circuitry by a function converter or inverter 31 (32) whose output provides a voltage inversely proportional to the issued power. This inverse voltage is converted by an inverter 41 (42) into a proportional frequency (i.e. an alternating voltage whose frequency has the desired proportionality). Any desired type of suitable circuitry may be used as inverter 41 (42) including so-called oscillators. Preferably, however, a parallel inverter operating with transistors is employed.

The outputs of the respective measuring members 11 and 12 are connected through equally dimensioned and preferably ohmic decoupling resistors 61 and 62 and through respective switches 614 and 624 to a common bus bar T. These resistors are traversed by a current which is proportional to the difference between the voltage furnished from the measuring members and hence is proportional to the difference of the respective power shares issued by the alternators F1 and F2. Consequently, the voltage drops occurring at the decoupling resistors 61 and 62 have a magnitude likewise proportional to the difference in alternator loads and whose direction or polarity—for example, referred to the input of the appertaining regulating amplifier—is indicative of the fact as to which measuring member furnishes the larger output voltage and which member furnishes the lower output voltage.

The voltage of these decoupling resistors is applied for controlling respective coordinated auxiliary regulators 51, 52 upon whose output (voltage or current) the amplifying factor (gain) of the correlated respective regulating amplifiers 21, 22 is dependent. Assume that this auxiliary regulator is of the integral type (I-regulator) and that the alternator F1 issues more power than the alternator F2 so that the voltages impressed upon the resistors 61 and 62 have the polarities indicated by arrows. Under such conditions, the regulators 51 and 52 continuously vary the amplifying factor of the regulating amplifiers until a uniform load distribution is attained and hence the voltages at the respective coupling resistors 61 and 62 have become equal to zero. Due to the different directions of the voltages of the respective decoupling resistors, the auxiliary regulators 51 and 52 act in the mutually inverse sense upon the two regulating amplifiers 21 and 22.

In this particular embodiment, the regulating amplifiers 21, 22 are connected ahead of the function converter 31, 32. For that reason, the auxiliary regulators 51, 52 must act upon the amplification of the regulated amplifiers 21 and 22 in such a manner that the output quantity of the one regulating amplifier which without the regulators had already the higher output voltage, will be additionally increased while the amplification of the other regulating amplifier will be decreased. Consequently, behind the function converter 31, 32 there will occur the inverse variation of the datum value for the power regulator that is required for correcting the load distribution. That is, the datum value for the power regulator appertaining to the more highly loaded alternator F1 becomes reduced and thereby, the feed to its diesel engine and, the datum value for the other, less loaded, alternator F2 is increased because the feed of combustion mixture to the diesel engine of the latter is increased and hence, the power output of the alternator F2 is also increased.

Figure 3:
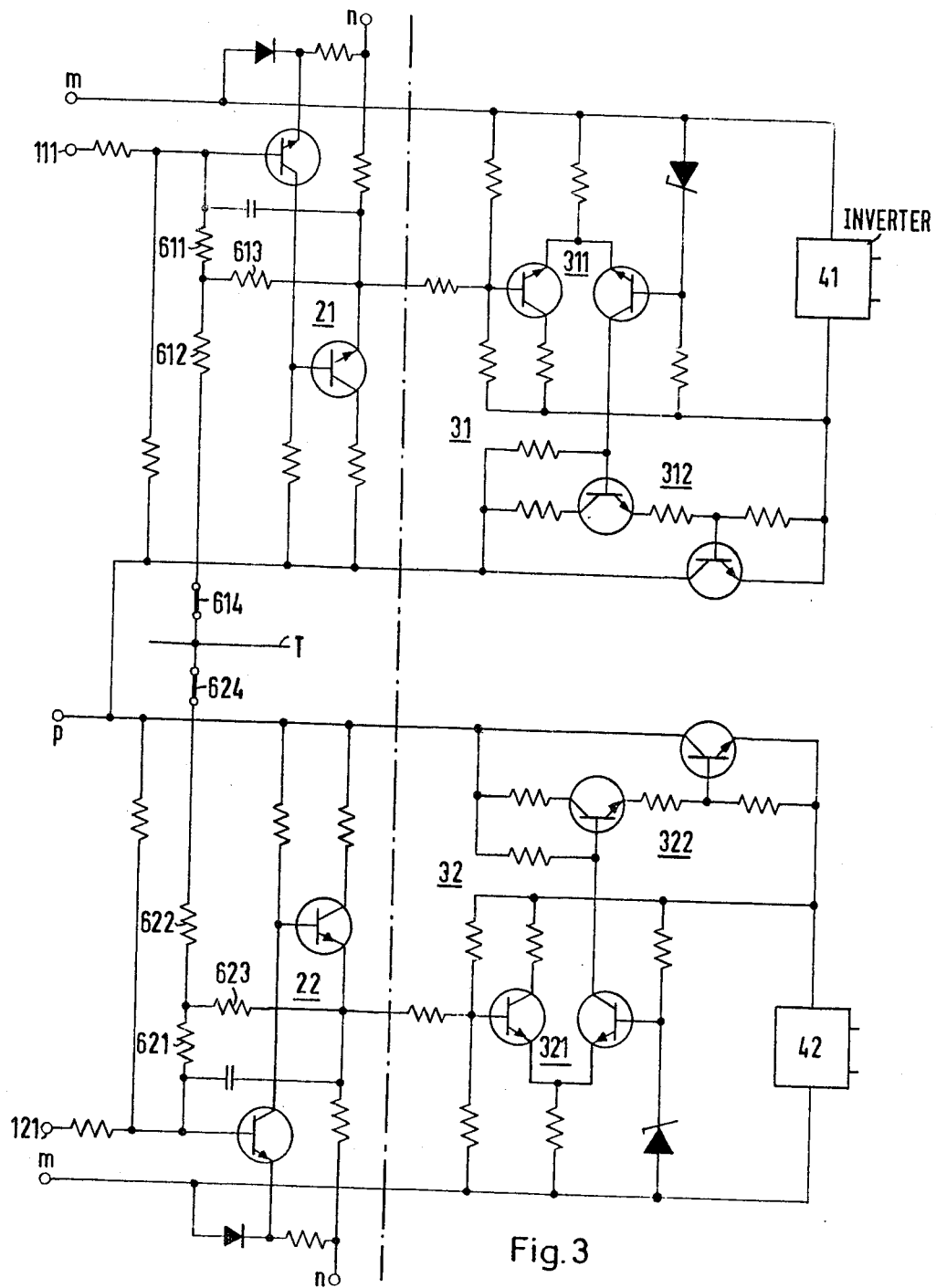
FIG. 3 is a detailed circuit diagram of the portion of FIG. 2 which characterizes the features of the present invention proper.

FIG. 3 shows the circuit details of a portion of the system shown in FIG. 2 equipped with a proportionally active auxiliary regulator, the same reference characters being applied as in FIG. 2. In comparison with FIG. 2, however, the measuring or sensing members (O1 and O2) are omitted, only their respective output terminals 111 and 121 being illustrated. The two alternators are likewise not shown in FIG. 3.

The regulating amplifier 21 (22) of each of the two regulating systems according to FIG. 3 comprises a two-stage transistor amplifier of conventional circuitry. The amplifying gain of this transistor amplifier is controlled by a feedback constituted by resistors 611 and 613 (621 and 623). One of these negative feedback resistors (611, 621) is also a portion of the decoupling resistor composed of the individual resistors 611 and 612 (621 and 622). Hence, the effective amplifying gain depends upon the magnitude and polarity of the equalizing current which flows through the decoupling resistors and which depends upon the load difference of the alternators.

The function converter (31, 32 in FIG. 2) is constituted in the embodiment of FIG. 3 by a difference amplifier 311 (321) of conventional circuit design and conventional performance. The output current of the amplifier 311 (321) controls the operation of a control circuit 312 (322) which is equipped with transistors and is connected in the feed circuit of the inverter 41 (42). The control circuit 312 (322) adjusts the current fed to the inverter 41 (42) in dependence upon the output of the amplifier 311 (312). Consequently, the frequency issuing from the inverter can be made inversely proportional to the voltage supplied through the terminal 111 (121) to the regulating amplifier 21 (22). However, this proportionality factor is additionally modified by the auxiliary regulator according to the magnitude and polarity of the difference between the loading of the respective alternators. However, it is within the nature of a proportional regulator (P-regulator) that a completely equal load distribution is not obtainable and that there will remain some amount of residual error. This error can be reduced by increasing the amplification of the auxiliary regulator. In cases where this is desirable or necessary, the voltage drop occurring at the decoupling resistors 611, 612 (621, 622) is employed for controlling a pre-amplifier and only the output quantity furnished by this pre-amplifier is used for modifying the amplification of the regulating amplifier proper, for example, through the appertaining negative feedback circuit.

It will be understood, that the invention is applicable for any desired number of alternator sub-systems operating in parallel relation to each other. The decoupling resistors of all such systems need only be connected to the common bus bar T.

To those skilled in the art, it will be obvious upon a study of this disclosure that various other modifications are readily applicable and that therefore the invention may be given embodiments other than those particularly illustrated and described herein, without departing from the true spirit and fair interpretation of the scope of the claims annexed hereto.

We claim:

1. With a plurality of alternators having individual drives and having a main bus to which said alternators are connected in parallel, the combination of a regulating system comprising a drive speed regulator connected with each of said respective alternator drives for varying the alternator output power, a power regulator having an output for furnishing a datum quantity for said drive speed regulator and having input means electrically connected to the alternator for supplying to said power regulator a quantity indicative of the difference between a first magnitude inversely proportional to the active power issued by said alternator and a second magnitude proportional to the alternator frequency, said input means comprising a regulating amplifier of variable amplifying gain connected between each of said alternators and said power regulator decoupling resistor means, an auxiliary bus, said regulating amplifiers of all of said alternators being connected through said respective decoupling resistor means to said auxiliary bus and having respective gain control means connected to said respective decoupling resistor means so as to have the gain dependent upon the magnitude and polarity of the voltage drop of said resistor means for varying the difference between the respective amplifier output voltages in the sense required to substantially uniformly distribute upon said alternators the active power fed to said main bus.

2. In an alternator regulating system according to claim 1, said speed regulator of each alternator drive being of the proportional type (P-regulator), and each of said power regulators being of the integral type (I-regulator).

3. In an alternator regulating system according to claim 2, said input means comprising active-power sensing means electrically connected to each of said respective alternators and inverter means connected between said sensing means and said power regulator to furnish said first magnitude inversely proportional to the active power issued by said alternator.

4. In an alternator regulating system according to claim 3, said regulating amplifier being interposed between said sensing means and said inverter means, the connection of said gain control means to said decoupling resistor having the polarity required for increasing said alternator voltage difference with an increase of said voltage drop of said resistor.

5. In an alternator regulating system according to claim 3, said inverter means being connected between said sensing means and said regulating amplifier, the connection of said gain control means to said decoupling resistor having the polarity required for decreasing said alternator voltage difference with an increase of said voltage drop of said resistor.

6. An alternator regulating system according to claim 3, comprising an auxiliary regulator interposed between said decoupling resistor means and said gain control means of said regulating amplifier, said auxiliary regulator having an input connected to said resistor means and having an output which controls the gain of said regulating amplifier.

7. In an alternator regulating system according to claim 6, said auxiliary regulator being of the integrating type (I-regulator).

8. In an alternator regulating system according to claim 1, said regulating amplifier having a negative feedback circuit, and said decoupling resistance means having at least a portion connected in said feedback circuit.

References Cited

UNITED STATES PATENTS

| | | | |
|---|---|---|---|
| 2,790,091 | 4/1957 | Chapman et al. | 307—53 X |
| 3,303,349 | 2/1967 | Sinclair et al. | 307—57 X |
| 3,405,282 | 10/1968 | Balkow et al. | 307—57 |

ROBERT S. MACON, Primary Examiner

H. J. HOHAUSER, Assistant Examiner

PO-1050
(5/69)

UNITED STATES PATENT OFFICE
CERTIFICATE OF CORRECTION

Patent No. 3,510,672      Dated May 5, 1970

Inventor(s) Herbert Poppinger, Heinz Lütge and Manfred Liska

It is certified that error appears in the above-identified patent and that said Letters Patent are hereby corrected as shown below:

In the heading, page 1, column 1 - the German priority number should read --P 15 88 808.1--

SIGNED AND SEALED
SEP 29 1970

(SEAL)
Attest:

Edward M. Fletcher, Jr.
Attesting Officer

WILLIAM E. SCHUYLER, JR.
Commissioner of Patents